No. 771,503. PATENTED OCT. 4, 1904.
W. S. SCHAEFFER.
MILK AND CREAM SEPARATOR.
APPLICATION FILED MAR. 22, 1904.
NO MODEL. 3 SHEETS—SHEET 2.
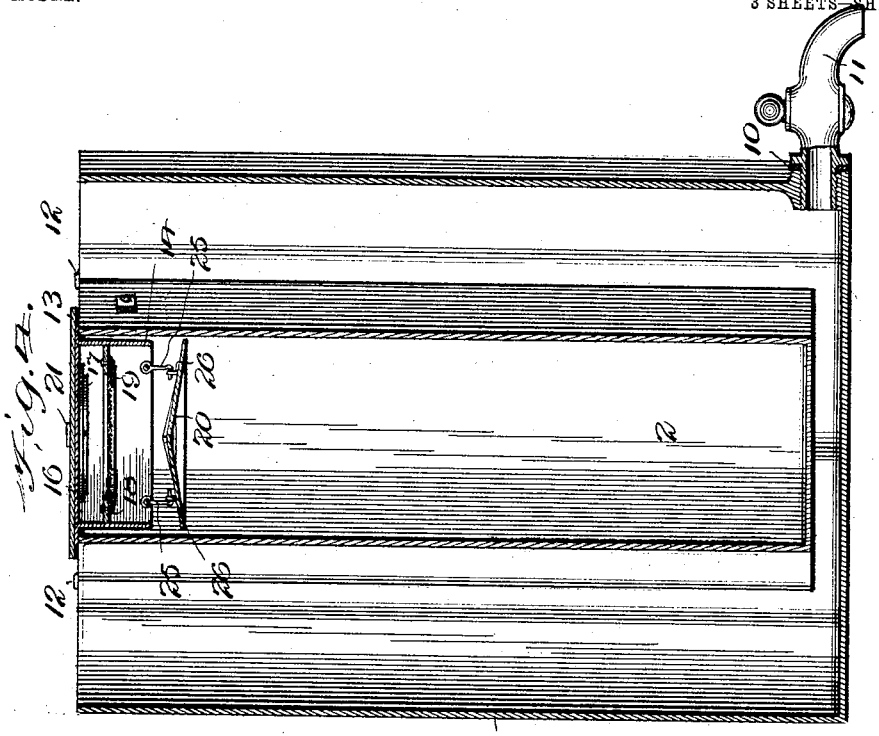
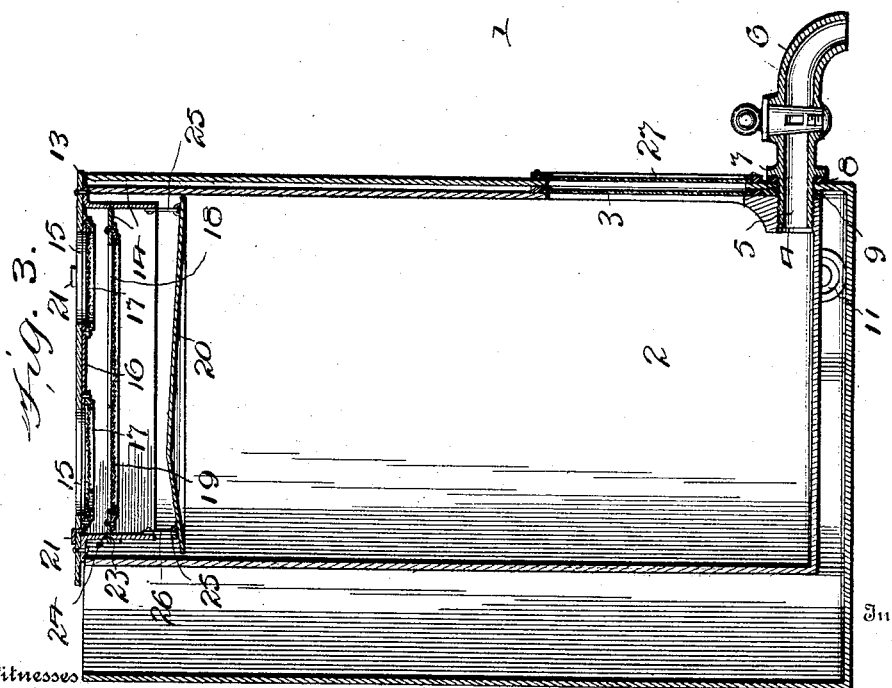

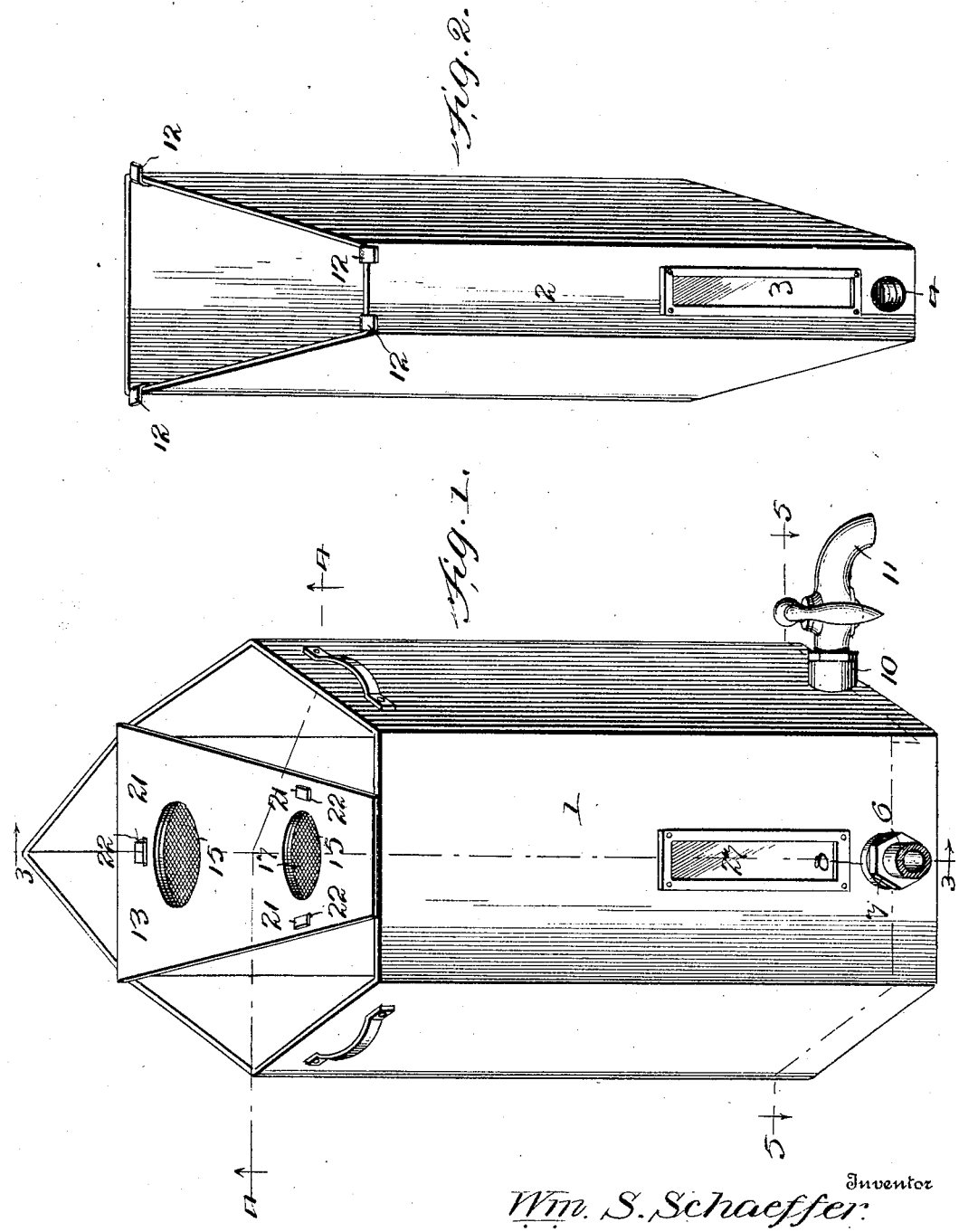

No. 771,503. PATENTED OCT. 4, 1904.
W. S. SCHAEFFER.
MILK AND CREAM SEPARATOR.
APPLICATION FILED MAR. 22, 1904.
NO MODEL. 3 SHEETS—SHEET 3.
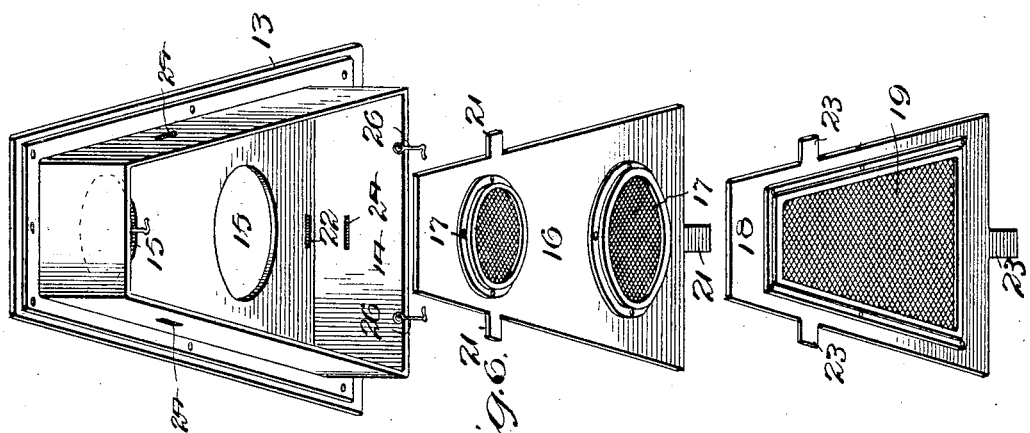
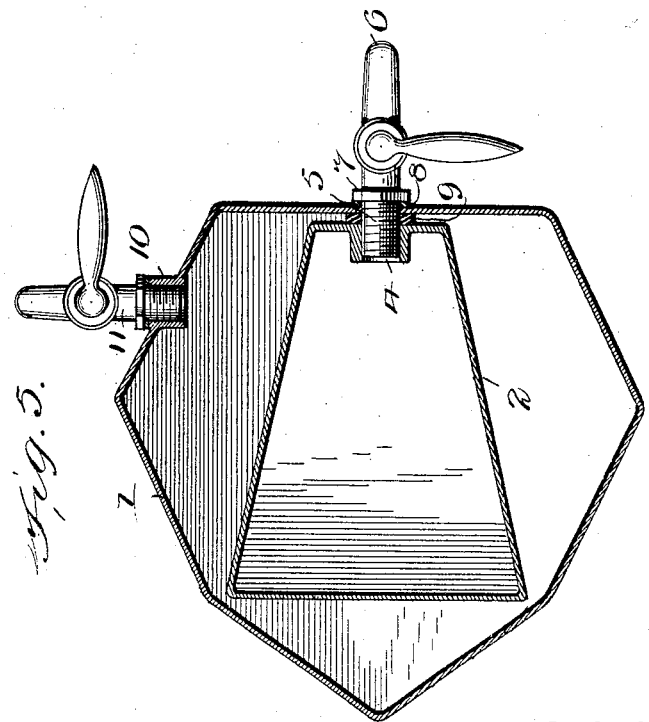
Witnesses
F. C. Barry
J. A. Beckham
Inventor
Wm. S. Schaeffer.
By W. F. Fitzgerald
Attorneys No. 771,503.

Patented October 4, 1904.

UNITED STATES PATENT OFFICE.

WILLIAM S. SCHAEFFER, OF LEESPORT, PENNSYLVANIA.

MILK AND CREAM SEPARATOR.

SPECIFICATION forming part of Letters Patent No. 771,503, dated October 4, 1904.

Application filed March 22, 1904. Serial No. 199,346. (No model.)

*To all whom it may concern:*

Be it known that I, WILLIAM S. SCHAEFFER, a citizen of the United States, residing at Leesport, in the county of Berks and State of Pennsylvania, have invented certain new and useful Improvements in Milk and Cream Separators; and I do hereby declare the following to be a full, clear, and exact description of the invention, such as will enable others skilled in the art to which it appertains to make and use the same.

My invention relates to combined milk-coolers and cream-separators; and it consists of certain novel features of combination and construction of parts, the preferred form or materialization whereof will be hereinafter clearly set forth, and pointed out in the claims.

The prime object of my invention, among others, is to provide an appliance of the character specified which will be of comparatively cheap though reliably efficient construction and the parts of which may each be readily assembled in its respective operative position.

A further object of my invention, among others, is to provide a cream-separator and milk-cooler which will act upon, cool, and consequently separate the largest possible quantity of whole milk, even though it be in a fresh or warm state, with the use of a minimum amount of cold water or water and ice.

A further object of my invention is to provide a construction which will enable the various parts to be quickly separated, whereby the same may be thoroughly and easily cleansed.

Other objects and advantages will be hereinafter made clearly apparent, reference being had to the accompanying drawings, which are made a part of this application, and in which—

Figure 1 shows a perspective view of my invention complete ready for use, the milk-faucet being broken away for convenience of illustration. Fig. 2 is a perspective detail view of the inner chamber separated from the exterior casing. Figs. 3 and 4 are longitudinal vertical sections taken at right angles to each other and showing my complete milk and cream separator and all the parts thereof properly assembled. Fig. 5 is a horizontal section of Fig. 1 on line 5 5. Fig. 6 shows the cover or closure member and parts carried thereby separated from each other.

Referring to the various details and coöperating accessories of my invention, in which numerals will be employed, 1 indicates the casing or body portion proper of my cream and milk separator, which is preferably made so that it will have the general outline or form in cross-section as indicated in Fig. 5 and other views, whereby the largest quantity of reservoir-space for the water and ice will be provided. Within the casing 1 I dispose the milk-receptacle 2, which in cross-section presents the outline of a truncated cone, as will be observed by reference to Fig. 5.

The interior casing or milk-receptacle 2 is of such size that it may be located within the casing 1 without contacting or engaging any part thereof and is provided on its forward side with a slotted opening which is occupied or filled by a suitable piece of glass or the like, as indicated by the numeral 3. The forward side of the casing 2 is also provided with a threaded aperture 4, designed to register in location with an aperture formed in the front part of the casing 1, whereby the threaded stem 5 of the milk-drawing faucet 6 may be seated, said faucet being provided with a flange 7, adapted to bear against a gasket 8, interposed between the flange and a contiguous part of the casing 1.

It will be observed by reference to Fig. 5 that the casings 1 and 2 are slightly separated and are held separated by the gasket 9, thereby insuring that no leakage around the faucet can occur. The casing 1 is also provided with a suitable nozzle or extension 10, designed to seat the threaded end of the faucet 11, the latter being designed to withdraw the water from the exterior casing when it is desired to empty the same.

It is understood that the entire space around the interior casing, as circumscribed by the walls of the exterior casing, is to be filled with water or water and ice, whereby the contents of the receptacle 2 will be thoroughly cooled, inasmuch as said milk-receptacle will be entirely surrounded by water excepting at its upper end, suitable supporting-lugs 12 being provided to hold said casing slightly above the bottom of the main receptacle, as shown in Figs. 2 and 4.

It will be understood that the main receptacle 1 may be provided with any suitable form of lid or closure deemed most suitable for the purpose; but I wish to call particular attention to the closure or lid section which I have provided for the milk-receptacle, which, by reference to Fig. 3 and other views, consists of the main closure proper, 13, of such size as to extend slightly over the edges of the casing 2 and is provided with a depending flange 14 of such size and shape as to fit loosely within said receptacle. The closure 13 is provided with the openings 15, and secured beneath the openings 15 is the plate 16, having apertures therein which are filled with the strainers 17, properly located to register with the openings 15 in the closure or lid proper, 13, and it is therefore obvious that when the milk is poured through the openings 15 the strainers 17 will arrest and remove from the combined milk and cream any particles of foreign matter. The flange 14 also carries the auxiliary strainer-plate 18, having the strainer 19 of more finely-meshed character than the strainers 17, and it therefore follows that any finer particles of foreign matter which may have passed through the strainers 17 will be arrested by said strainer 19.

In order to prevent the milk and cream from passing straight down toward the bottom section of the receptacle 2, I provide the deflector-plate 20, which, as will be observed by reference to Figs. 3 and 4, will be seen to be slightly conical in form, the raised central portion of the plate tending to distribute the milk and cream in all directions, and since said plate is of proper size that its edges will be disposed near the walls of the receptacle 2 it follows that the milk and cream passing off of the plate will be directed into engagement with the walls of the receptacle and run down the same.

Inasmuch as the walls of the receptacle 2 are directly in contact with the ice and water contained within the casing 1, it follows that the milk will be thoroughly cooled before it shall have reached the bottom of the receptacle 2. The closure or lid-section 13, it will therefore be observed, is of such character as to carry coöperating strainers and a deflector-plate, whereby the milk is thoroughly cleansed during the straining process and afterward delivered into engagement with the walls of the receptacle 2, insuring that in passing down said walls the animal heat will be entirely removed.

It will be understood that the strainer-plates proper, 16 and 18, may be secured in any desired way, though I have shown the plate 16 as being provided with the anchoring extensions 21, which are adapted to take into suitable slots 22 and be bent in suitable shape to prevent withdrawal therefrom. In like manner the strainer-plate 18 is provided with the anchoring extensions 23, designed to take into the slotted apertures 24, formed in the flange 14, while the deflector-plate is sustained in its operative position by the depending hooks 25, carried by the flange 14 and adapted to be disposed in engagement with the staples 26, carried by a contiguous part of said deflector-plate.

It will thus be seen that I have provided a thoroughly efficient and reliable milk and cream separator, the various parts of which may be manufactured at a minimum cost and readily assembled in their operative positions, and believing that the construction and manner of using my improved cream-separator have thus been made clearly apparent further description is deemed unnecessary, though it may be stated that the exterior casing is also provided with a slotted opening filled with glass, as designated by the numeral 27, the position of which is in direct registration with the glass opening 3, thus enabling the operator to determine at a glance when a proper separation of the cream and milk has been effected.

While I have described the preferred combination and construction of parts deemed necessary in materializing my invention, I desire to comprehend such substantial equivalents and substitutes as may be regarded as falling fairly within the scope of my invention.

What I claim as new, and desire to secure by Letters Patent, is—

1. In a cream and milk separator, the combination with an exterior casing, of an interior casing fitting loosely therein, a plurality of supporting-lugs for said interior casing, a closure 13 for said interior casing, said closure having a depending flange adapted to take loosely into said interior casing, said closure also having suitable openings 15 therein, a plate 16 secured to said closure and having apertures therein adapted to register with the openings 15 in the closure 13, strainers 17 filling said apertures in the plate 16, an auxiliary plate 18 carried by the depending flange of the closure 13 and disposed below the plate 16, said auxiliary plate 18 being provided with a strainer 19 of a closer mesh than the strainers 17, a conical deflector 20 disposed below said strainers and secured to the depending flange by means of hooks 25 carried by said flange-engaging staples 26 carried by said deflector-plate whereby the milk and cream will be directed along the walls of the interior casing and be thoroughly cooled, substantially as set forth.

2. The herein-described milk and cream separator comprising an outer and an inner casing, a closure 13 for said inner casing having a depending flange 14, said closure also having suitable openings therein, a strainer-plate 16 having openings therein designed to register with the openings in the closure 13, said plate 16 having anchoring extensions 21 adapted to take into slots 22 in the closure 13 and be bent over to secure the plate 16 thereto, and an auxiliary strainer-plate 18 having extensions 23 designed to take into apertures 24 in the depending flange 14 whereby said auxiliary strainer will be held in place, and a deflector 20 secured to the lower edge of said depending flange by means of depending hooks 25 carried by said flange-engaging staples 26 carried by said deflector, all combined substantially as set forth.

In testimony whereof I have signed my name to this specification in the presence of two subscribing witnesses.

WILLIAM S. SCHAEFFER.

Witnesses:
EDWARD H. BECKER,
MONROE J. ROTHERMEL.